Figure 1:
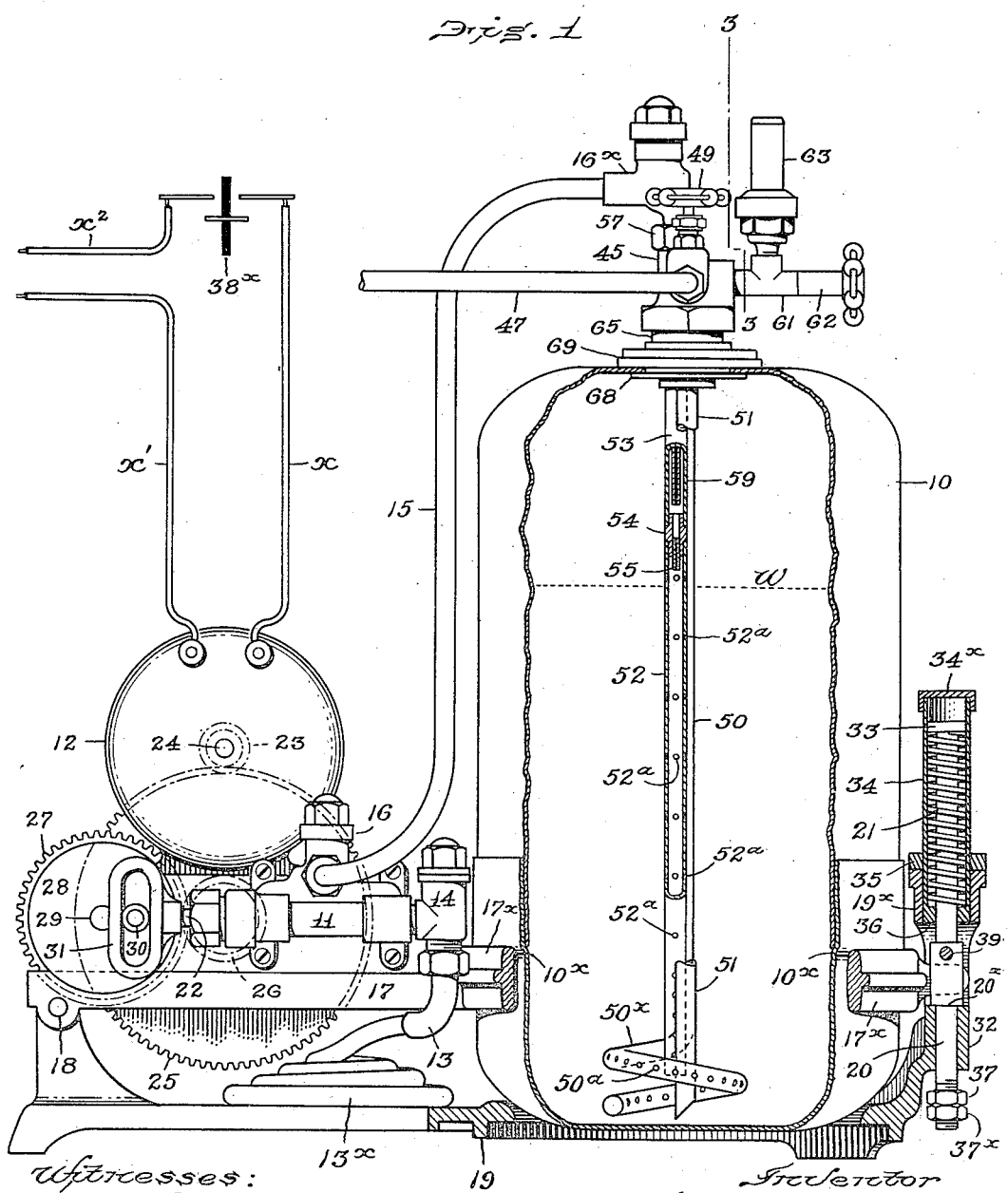

E. E. MURPHY.
CARBONATING APPARATUS.
APPLICATION FILED FEB. 1, 1912.

1,055,648.

Patented Mar. 11, 1913.

2 SHEETS—SHEET 1.

Witnesses:
W. S. Dot
Walter P. Abell

Inventor
Edward E. Murphy
by Knight Brown Quimby May
Attorneys

E. E. MURPHY.
CARBONATING APPARATUS.
APPLICATION FILED FEB. 1, 1912.
1,055,648.
Patented Mar. 11, 1913.
2 SHEETS—SHEET 2.
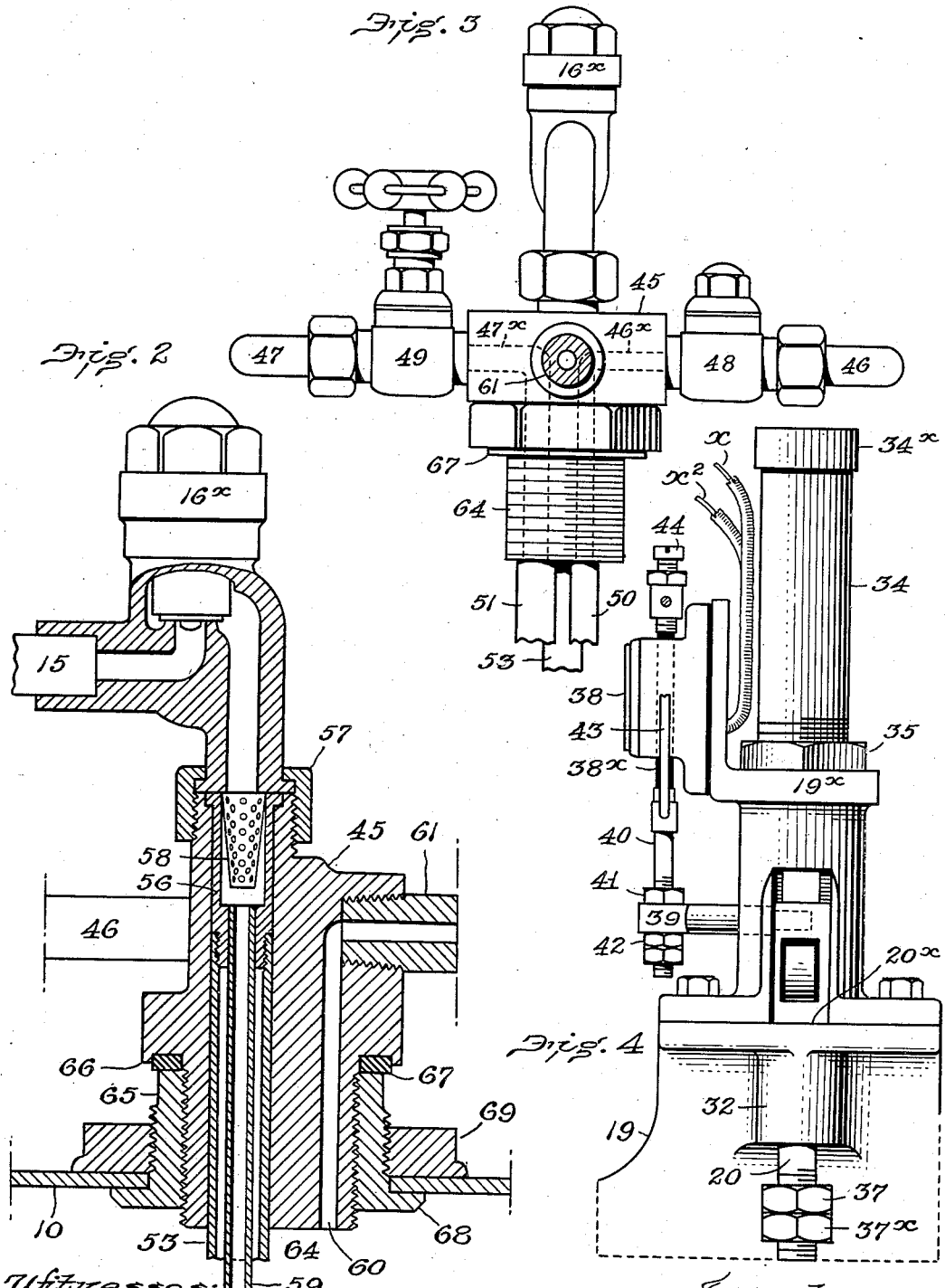

UNITED STATES PATENT OFFICE.

EDWARD E. MURPHY, OF WINCHESTER, MASSACHUSETTS.

CARBONATING APPARATUS.

1,055,648.  Specification of Letters Patent.  Patented Mar. 11, 1913.

Application filed February 1, 1912. Serial No. 674,783.

*To all whom it may concern:*

Be it known that I, EDWARD E. MURPHY, a citizen of the United States, and resident of Winchester, in the county of Middlesex and State of Massachusetts, have invented certain new and useful Improvements in Carbonating Apparatus, of which the following is a specification.

The object of the present invention is to provide an apparatus for furnishing a continuous supply of carbonated water.

The apparatus comprises a tank or airtight receptacle, a pump for pumping water into the receptacle, means controlled by the weight of the receptacle for rendering the pump operative and inoperative, and means within the receptacle for delivering carbon dioxid under pressure and for thoroughly mixing the same with water.

Of the accompanying drawings, which illustrate one form in which the invention may be embodied: Figure 1 represents a side elevation, partly in section. Fig. 2 represents a vertical section through the pipes and other fittings at the top of the mixing tank. Fig. 3 represents an elevation of the same fittings from the side, indicated by line 3—3 of Fig. 1. Fig. 4 represents an elevation of the motor-controlling means as viewed from right to left with reference to Fig. 1.

The same reference characters indicate the same parts wherever they occur.

Referring first to Fig. 1, a tank indicated at 10 provides a chamber into which water and carbon dioxid are forced under pressure and in which they are mixed. The water pump is indicated at 11, and a motor for driving the same is indicated at 12. Water is conducted to the pump by a supply pipe 13 which is provided with a check valve 14 for preventing flow away from the pump. The pump forces the water through a pipe 15 which delivers into the tank 10. The pump illustrated is of the double-acting type, and the pipe 15 is provided with two check valves, indicated respectively at 16 and 16ˣ.

All the elements thus far indicated, and others hereinafter described, are mounted upon a movable support indicated at 17. This support is provided for the purpose of utilizing the weight of the tank to control the motor which operates the water pump. The method of control is as follows: When the supply of carbonated water in the tank is reduced to a predetermined point, the movable support 17 is automatically raised by a supporting spring and an electric switch is operated by the upward movement of the support to turn on the power by which the motor is operated. The pump is thus set in motion and the quantity of water in the tank is increased until the weight of the tank depresses the support 17. The downward movement of the support is utilized to turn off the power by which the motor is operated, thus automatically furnishing a supply of water. The minimum and maximum supply in the tank may be varied by regulating devices hereinafter described. According to this embodiment of the invention, one end of the movable support 17 is pivotally mounted upon a pivot member 18 which is supported by a base 19. The opposite end of the support 17 is seated in a vertically movable plunger 20 which is subject to upward force exerted by a compression spring 21. The support 17 is formed with a suitable platform for the motor and with suitable provisions for supporting the pump and for supporting gears for driving the pump. The pump and motor are preferably arranged at the end nearer the pivot 18 so that they will be subject to comparatively little movement. The tank 10 is preferably disposed as far as possible from the pivot 18, so that its weight may be used to good advantage. The support is formed with a ring-shaped portion 17ˣ adapted to surround the tank and to engage a shoulder 10ˣ on the exterior of the tank, whereby the tank is held from slipping through the ring-shaped portion. The tank may be quickly inserted and removed, and requires no means for holding it in place.

The piston plunger or rod of the pump is indicated at 22. The mechanism for transmitting motion from the motor to the plunger 22 comprises a gear 23 on the motor shaft 24, a gear 25 driven by the gear 23, a gear 26 compounded with the gear 25, a gear 27 driven by the gear 26, a crank disk 28 affixed to the gear 27 by means of a shaft 29, a crank pin 30 carried by the disk 28, and a slotted yoke or head 31 affixed to the plunger 22 and embracing the crank 30. The motor illustrated is of the electric type and its feed wires are indicated at $x$ and $x'$. It will be understood, however, that the invention is not limited to the employment of an electric motor and that a motor of any other type may be employed and controlled by the weight of the tank in a manner similar to that hereinafter described.

The lower end of the plunger 20 at the free end of the support 17 is adapted to slide vertically in a bearing 32 afforded by the base 19. The plunger is formed with a shoulder $20^x$ which is adapted to rest upon the upper end of the bearing when the plunger is depressed. The upper end of the plunger is provided with a head 33 and is surrounded by the compression spring 21, before mentioned. The spring and head are inclosed in a barrel 34 whose upper end is closed by a cap $34^x$. The lower end of the barrel is screw-threaded in a bracket $19^x$ which extends upwardly from the base 19. A check nut 35 is threaded on the barrel and is adapted to clamp the barrel with relation to the bracket. The lower end of the barrel is formed to provide a bearing 36 for the plunger and to provide a seat for the lower end of the spring 21. By screwing the barrel up or down, the spring 21, and consequently the plunger, may be raised or lowered. If the barrel be in a relatively high position, a relatively great quantity of water will be required in the tank to depress the plunger until its shoulder $20^x$ rests upon the bearing 32. On the other hand, if the barrel be in a relatively low position, a small quantity of water in the tank will be sufficient to depress the plunger to the same position. This is a question of whether spring 21 will have to be compressed little or much in order to move the plunger to its lowest position. The lower end of the plunger extends below the bearing 32 and is screw-threaded to receive a nut 37 whereby the upward movement of the plunger may be limited. A check nut $37^x$ is provided for fixing the position of the nut 37.

The movement of the plunger, as limited by the shoulder $20^x$ and the nut 37, is utilized to control the power by which the motor is operated. Fig. 4 illustrates an electric switch, which is indicated at 38 and shown as being affixed to the bracket $19^x$. One of the wires from the motor, for example wire $x$, extends to the switch. The other wire from the motor may be connected with a source of energy, and the return wire for connecting the switch with the source of energy is indicated at $x^2$. Any suitable switch may be used for the purpose of the present invention, and it will not be necessary to illustrate any switch in detail. It will be sufficient to illustrate in a general way how the movement of the plunger 20 is transmitted to a movable element of the switch. A pin 39 is affixed to the plunger and extends laterally, as shown by Fig. 4. A rod 40 extends vertically through the pin 39 and is secured to the pin by nuts 41 and 42. This rod carries a yoke 43 which extends around the switch casing and which is provided with a screw 44 above the casing, in line with the rod 40. The bottom of the yoke 43 which extends under the switch is adapted to engage the lower end of a vertically movable plunger $38^x$ which extends through the switch. The screw 44 is adapted to be set tightly against the upper end of the plunger $38^x$. The element $38^x$ is the movable element of the switch whereby a circuit is closed when it is moved upwardly, and is opened when it is moved downwardly. The nut 37 provides for limiting the range of movement of the plunger 20 to meet the requirements of the switch 38.

The pipe 15 by which water is conducted from the pump to the tank 10 is connected by a suitable union to a fitting 45 tightly secured in the top of the tank. This fitting is formed for the attachment of two other pipes, one of which is for conducting carbon dioxid to the tank, and the other of which is for conducting carbonated water to a suitable point of discharge.

The inlet pipe for the carbon dioxid is indicated at 46, and the outlet pipe for the carbonated water is indicated at 47. A check valve 48 is placed in the pipe 46 so as to open toward the tank. A shut-off valve 49 is provided in the outlet pipe 47. A port $46^x$ is formed in the fitting 45 to conduct the carbon dioxid to a pipe 50 which extends downwardly in the tank. The fitting is provided with a port $47^x$ which forms communication between the discharge pipe 47 and a second pipe 51 extending vertically in the tank. The pipe 50 extends inwardly to the bottom of the tank and terminates in a coil $50^x$. In this coil the pipe is provided with a number of small discharge openings $50^a$. The carbon dioxid, being delivered into the tank under pressure of 140 pounds to the square inch, for example, is discharged through the openings $50^a$ in fine jets, and, being lighter than water, rises. A considerable proportion of it is absorbed by the water while it is rising through the water. The lower end of the pipe 50 is preferably closed so that the carbon dioxid will escape only through the fine openings $50^a$.

The water passing from the pump into the tank is delivered through a pipe 52. The lower end of the pipe is closed, but the pipe is provided with numerous small discharge openings $52^a$ which are preferably arranged in groups of which the uppermost is slightly above the maximum water level at W. The pipe 52 is connected to an upper pipe section 53 by means of a coupling 54. This coupling is provided with a nozzle 55 whose bore is extremely small and adapted to direct a fine stream centrally and at high velocity through the pipe 52. The stream from the nozzle exerts a downward pull on the carbon dioxid which accumulates above the water, and carries it into the water for a considerable distance. As previously explained, the pump is operated only when the water level is rising from minimum to maximum, and the carbon dioxid is delivered under suitable pressure, which for the purpose of explanation, has been stated as 140 pounds. Now, therefore, if the pressure in the tank is 140 pounds when the water is at its lowest level, and if the pump begins to work against that pressure, it is obvious that the pressure will increase as the water level rises unless the carbon dioxid is absorbed by the water as fast as the water is pumped in. An increase of pressure should be avoided, for otherwise a continual increase of power would be required to operate the pump. Such increase of pressure is avoided, to a great extent at least, by the action of the fine stream of water in pulling the carbon dioxid below the water level. The pull is continuous while the pump is operating, and there is a continuous circulation through a part of the pipe 52, the carbon dioxid passing into the pipe through the holes above the water level, and the carbonated water and excess of induced carbon dioxid passing out of the pipe through the holes below the water level. The area of circulation, of course, rises with the water level, but the groups of holes are distributed along the length of the pipe at such intervals as to meet the requirements. One important point of the mixing operation is that the medium by which the carbon dioxid is pulled down is the fresh water which has the greater capacity to absorb, and that the stream of fresh water pulls more carbon dioxid than it can absorb, thus keeping an excess of carbon dioxid constantly passing through the previously charged water.

The operation just described causes maximum absorption of carbon dioxid as fast as the absorbing element is supplied, thus avoiding an increase of pressure while the pump is operating.

The upper end of the pipe 53 is screw-threaded to a nipple 56, and the nipple is flanged and securely held in the fitting 45 by the union 57 which connects the check valve 16$^x$ to the fitting 45. A strainer 58 is located in the nipple 56. A tube 59 of relatively small diameter is affixed to the nipple 56 and conducts the water to the nipple 54, which, as previously explained, is provided with a nozzle for forming the fine stream of water.

The fitting 45 is bored as indicated at 60 (see Fig. 2) to provide an outlet for air which initially occupies the tank and which collects from time to time while the apparatus is in operation. The bore 60 communicates with the bore of a plug 61 which is screw-threaded into the fitting 45. The plug 61 is provided with two outlets to one of which is connected a blow-off valve 62, and to the other of which is connected an automatic safety valve 63. The blow-off valve is intended to be used to vent the air in the tank when the apparatus is first put in operation, and to vent the air which collects little by little while the apparatus is in use. The safety valve is provided for affording relief when the pressure in the tank becomes too great. The outlet pipe for the carbonated water is open at the bottom, near the bottom of the tank.

The fitting 45 is formed with a screw-threaded nipple 64 whereby it is connected to a bushing 65 in the top of the tank. The fitting 45 is also provided with a flange 66 which surrounds a gasket 67, the gasket being used to form a tight joint between the fitting 45 and the bushing 65. The bushing is formed with a flange 68 which lies against the inner side of the tank and which is tightly seated by a nut 69 threaded upon the bushing outside the tank. The tank is preferably made in two sections, joined as shown by Fig. 1. This construction makes it possible to construct the tank of drawn metal, and also makes it possible to provide the flange 68 at the inner end of the nipple 65 and to insert the nipple through the top of the tank from the inside. The water-supply pipe 13 is preferably provided with a portion 13$^x$ in the form of a coil or in other form for the purpose of rendering it flexible so that it will not offer any serious opposition to the rise and fall of the pump when the support 17 is moved.

Having thus explained the nature of my said invention and described a way of constructing and using the same, although without attempting to set forth all the forms in which it may be made or all the modes of its use, what I claim is:

1. In an apparatus of the character described, a closed tank, means for delivering a gaseous fluid into the same, means for discharging downwardly and within said tank a stream of liquid under pressure, and a pipe disposed to surround such stream above and below the level of liquid in the tank, the internal diameter of said pipe being greater than the diameter of said liquid-discharging means, said pipe having perforations above and below the liquid level.

2. In an apparatus of the character described, a tank, a pipe extending up and down therein, said pipe having perforations in its side at different points along its length, means for delivering a liquid with pressure into the upper end of said pipe, means for delivering a gaseous fluid into said tank, outside said pipe, and means in the upper part of said perforated pipe for directing downwardly a stream of liquid of smaller diameter than the interior of said pipe, whereby the gaseous fluid in said tank is drawn inwardly through the perforations above the liquid and downwardly through said pipe and liquid, and forced outwardly through perforations below the level of the liquid.

3. In an apparatus of the character described, a closed tank, means for delivering a gaseous fluid into the same, means for discharging downwardly and within said tank a stream of liquid under pressure, and a pipe disposed to surround such stream above and below the liquid level, the internal diameter of said pipe being greater than the diameter of said liquid-discharging means, said pipe having perforations arranged in groups, said groups being above and below the liquid level.

In testimony whereof I have affixed my signature, in presence of two witnesses.

EDWARD E. MURPHY.

Witnesses:
WALTER P. ABELL,
P. W. PEZZETTI.